US008898130B1

(12) United States Patent
Sims et al.

(10) Patent No.: US 8,898,130 B1
(45) Date of Patent: Nov. 25, 2014

(54) ORGANIZING SEARCH RESULTS

(75) Inventors: Bradley T. Sims, Dallas, TX (US); Sivakumar Chinnasamy, Billerica, MA (US); Tsu-Jung Kung, Concord, MA (US); Chandrasekar Krishnan, Waltham, MA (US); Qi Gu, Burlington, MA (US); Yu Lo Cyrus Chang, Bedford, MA (US); Jian Huang, Woburn, MA (US); Yankang Jiang, Winchester, MA (US)

(73) Assignee: Supermedia LLC, Dfw Airport,, TX (US)

( * ) Notice: Subject to any disclaimer, the term of this patent is extended or adjusted under 35 U.S.C. 154(b) by 1729 days.

(21) Appl. No.: 12/031,028

(22) Filed: Feb. 14, 2008

Related U.S. Application Data

(60) Provisional application No. 60/889,874, filed on Feb. 14, 2007, provisional application No. 60/889,828, filed on Feb. 14, 2007, provisional application No. 60/889,830, filed on Feb. 14, 2007.

(51) Int. Cl.
*G06F 17/30* (2006.01)

(52) U.S. Cl.
USPC .......................................................... 707/706

(58) Field of Classification Search
USPC ......... 707/672, 673, 679, 699, 706, 708–711, 707/713, 715, 722, 723, 731, 732, 737, 763, 707/777, 778, 786, 796, 797–802, 828–830, 707/697, 739–755, 769–771
See application file for complete search history.

(56) References Cited

U.S. PATENT DOCUMENTS

| | | | | |
|---|---|---|---|---|
| 7,181,438 | B1 * | 2/2007 | Szabo | 1/1 |
| 2003/0033292 | A1 * | 2/2003 | Meisel et al. | 707/3 |
| 2003/0149937 | A1 * | 8/2003 | McElfresh et al. | 715/517 |
| 2005/0076014 | A1 | 4/2005 | Agarwal et al. | |
| 2005/0080772 | A1 | 4/2005 | Bem | |
| 2005/0097024 | A1 | 5/2005 | Rainey | |
| 2005/0144069 | A1 | 6/2005 | Wiseman et al. | |

* cited by examiner

*Primary Examiner* — Hosain Alam
*Assistant Examiner* — Reza Hosseini
(74) *Attorney, Agent, or Firm* — Bejin Bieneman PLC

(57) ABSTRACT

At least one listing is retrieved based on a search query, the query including at least one parameter associated with an element of a hierarchical index A determination of a normalized click-through rate for each of the at least one listings is made, the normalized click-through rate for a listing being based on a click-through rate for the listing that is adjusted according to one or more positions in which the listing has been displayed in each of a plurality of sets of search results. A determination is made of a position for the at least one listing in a set of search results based at least in part on an aggregation of the aggregate normalized click-through rates associated with at least one level of a hierarchical index.

20 Claims, 6 Drawing Sheets

| Id | Advertiser | Region | Category | Description | Full Text | Keywords | Date Added | Hyperlink |
|---|---|---|---|---|---|---|---|---|
| 1 | Company1 | 1 | Restaurants | Justin's Deli | Check o… | food, deli | 1/7/2004 | http://ww. |
| 2 | Company1 | 1 | Restaurants | Pizza Place | Be sure… | pizza, food | 2/5/2005 | http://ww. |
| 3 | Company2 | 1 | Restaurants | Yum's | Yums is.. | food | 1/7/2004 | http://ww. |
| 4 | Company1 | 1 | Restaurants | Pappas Pizza | We have. | pizza, pappas | 2/5/2005 | http://ww. |
| 5 | Company2 | 2 | Restaurants | Pizza To Go! | Go get y.. | food, takeout | 11/30/3006 | http://ww. |
| 6 | Company2 | 2 | Restaurants | Taco Place | Mmmmm.. | food, taco | 12/2/2007 | http://ww. |
| 7 | Company1 | 2 | Restaurants | Family Dining | Somethin. | food, dining | 2/5/2005 | http://ww. |
| 8 | Company3 | 2 | Restaurants | Fast Pizza | 5 mins or. | pizza, fast | 12/23/2006 | http://ww. |

Listings
125

Listing Identifier
205

Listing Details
210

FIG. 2

Search Result Log 130

| Id | Rank | Keywords | Clicked | Region | Search Date |
|---|---|---|---|---|---|
| 2 | 1 | pizza | TRUE | 1 | 11/5/2007 |
| 4 | 2 | pizza | FALSE | 1 | 11/5/2007 |
| 5 | 3 | pizza | FALSE | 1 | 11/5/2007 |
| 8 | 4 | pizza | FALSE | 1 | 11/5/2007 |
| 1 | 1 | food | FALSE | 2 | 11/22/2007 |
| 2 | 2 | food | TRUE | 2 | 11/22/2007 |
| 3 | 3 | food | FALSE | 2 | 11/22/2007 |
| 4 | 4 | food | FALSE | 2 | 11/22/2007 |

Listing Identifier 205

Search Log Details 405

FIG. 4

ORGANIZING SEARCH RESULTS

This application claims the benefit of U.S. provisional application Ser. Nos. 60/889,874 (entitled "ADVERTISING METHOD"), 60/889,830 (entitled "OPTIMIZED BIDDING SYSTEM"), and 60/889,828 (entitled "CLICK-THROUGH RATE NORMALIZATION"), all filed Feb. 14, 2007, and all hereby incorporated by reference in their entireties. This application is also related to the following U.S. patent applications that are commonly owned with, and filed the same day as, the present application: Ser. No. 12/031,098, (entitled "CLICK-THROUGH RATE ADJUSTMENTS"), and Ser. No. 12/031,124, (entitled "OPTIMIZED BIDDING FOR PAY-PER-CLICK LISTINGS"). The foregoing related applications are fully incorporated herein by reference in their entireties.

BACKGROUND

Search engines, directories of advertisers, and the like, e.g., available on the World Wide Web, often charge advertisers to have their listings included in a set of search results. Further, search engines and the like may charge advertisers different fees according to the position of an advertiser's listing in a set of search results. In some cases, an advertiser pays a fee for a listing included in a set of search results only when a user selects, e.g., clicks on, the listing. Such a listing may be referred to as a pay-per-click (PPC) listing. The position of a PPC listing in a set of search results, e.g., second in a set of five listings, may be determined according to a bid amount, i.e., an amount that an advertiser is willing to pay upon a user selection of the listing.

From the standpoint of being clicked on by a user, it is generally advantageous for a listing to be placed in a higher position, e.g., first as opposed to fourth in a set of five listings, because users often follow a tendency to click on listings that are placed in higher positions. Nonetheless, regardless of where they are placed in a set of search results, some listings may be more or less likely to be clicked on by a user than other listings. For example, two listings that may be placed in a third position in a set of five search results may have entirely different likelihoods of being clicked on by a user if so placed.

Where a search engine operator provides listings such as PPC listings, listings that are more likely to be clicked on by a user are more likely to generate revenue for the search engine operator than other listings. However, average click-through rates often vary dramatically among listings in different categories, e.g., categories of business, and among listings associated with different geographic locations. As a result, using the same average click-through rate for all categories and geographic locations may not foster accurate comparisons of click-through rates associated with different categories and/or geographic locations.

BRIEF DESCRIPTION OF THE DRAWINGS

FIG. 2 illustrates an exemplary set of listings.

FIG. 4 illustrates an exemplary search result log.

DETAILED DESCRIPTION

A search engine may provide listings in response to a query, the provided listings having been determined to be likely to be selected by a user. In the case of pay-per-click listings, the provided listings are generally determined to be likely to generate revenue for a search engine provider.

Figure 1:
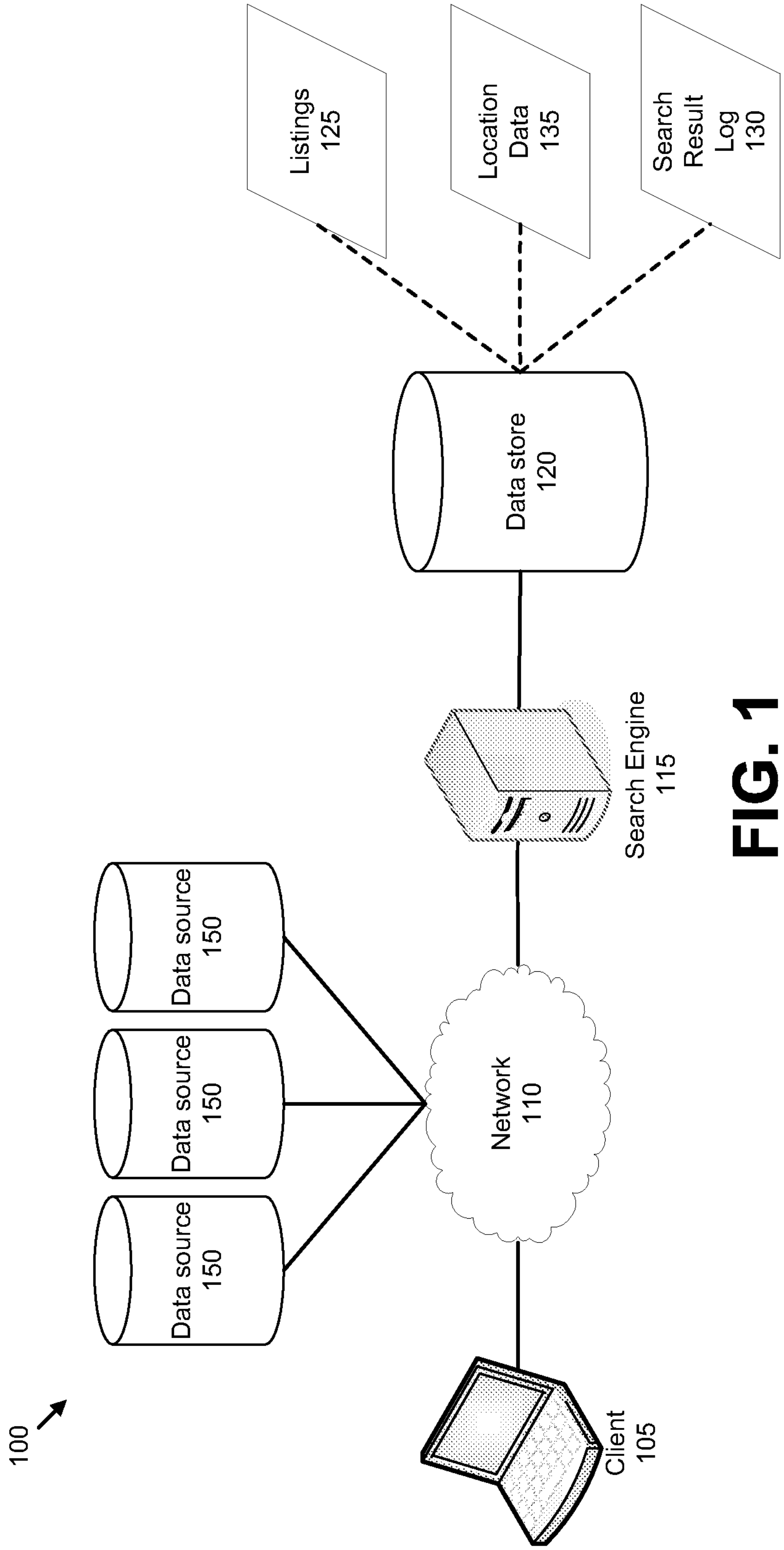
FIG. 1 illustrates an exemplary information distribution system that includes a client in selective communication with a search engine via a network.

FIG. 1 illustrates an exemplary information distribution system 100 that includes a client 105 in selective communication with a search engine 115 via a network 110. Search engine 115 also selectively communicates with a data store 120, possibly through network 110, but more likely though a local area network (LAN), an intranet, or the like (not shown in FIG. 1). Although shown as included in separate computing devices in FIG. 1, search engine 115 and data store 120 may be included within a single computing device, or may each include clusters of computing devices for purposes of redundancy, processing efficiency, etc. In any event, data store 120 may include listings 125 and a search result log 130. It should be understood that various embodiments of system 100 may include a variety of components, information types, interactions, etc., including, but in no way limited to those mentioned herein.

Client 105 provides a mechanism by which a user may communicate through network 110, e.g., to interact with search engine 115. For example, client 105 may be any one of a number of computing devices that include one or more software applications for facilitating such communications. For example, client 105 may be a desktop computer, a laptop computer, a mainframe computer, a mini-computer, a cell phone, a personal digital assistant, an internet-enabled set-top box, or other similar device. Also, while only one client 105 is shown in FIG. 1, many different clients 105 may submit queries and receive responses using system 100.

Client 105 typically submits a query to search engine 115 via network 110. Network 110 may include any medium or media capable of transmitting data between client 105 and search engine 115, such as the Internet, a local area network, a wide area network, a cellular network, etc. Search engine 115 may accept a query submitted by client 105 and may in turn query data store 120. Search engine 115 may be any device or combination of devices configured to receive information from one or more clients 105, and to in turn communicate with data store 120. For example, search engine 115 may be a server computer, a query server, a web server, a search server, a mainframe, a computing cluster, or the like.

Search engine 115 may include one or more web servers, which may facilitate access to client 105. Accordingly, search engine 115 may provide client 105 with a graphical user interface (GUI) such as a web page, hypertext markup language (HTML) page or the like. Such GUIs are typically accessible through a web browser that is included within client 105. Further, client 105 may display other kinds of user interfaces, such as a text-only interface, or any other interface capable of transmitting queries and receiving query results from search engine 115.

Computing devices such as those used for client 105, search engine 115, data store 120, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices generally each include instructions executable by one or more computing devices such as those listed above. Various steps and processes disclosed herein may be embodied in whole or in part in such instructions. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any tangible medium that participates in providing data (e.g., instructions), which may be read by a computer. Such a medium may take many forms, including, but not limited to, non-volatile media, volatile media. Non-volatile media include, for example, optical or magnetic disks and other persistent memory. Volatile media include dynamic random access memory (DRAM), which typically constitutes a main memory. Such instructions may be transmitted by one or more transmission media, including coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

Data store 120 may include one or more relational databases. Alternatively or additionally, data store 120 may include one or more object-oriented or hierarchical databases, or other mechanisms for storing and accessing data, including arrays, pointers, flat files, etc. As mentioned above, data store 120 may be included in a separate computing device from that hosting search engine 115, or may be a software application executing on a same computing device as search engine 115.

Listings 125 may be stored in data store 120, whereby listings 125 may be updated, deleted, added, accessed, etc. Individual listings 125 may be represented by one or more database records included in data store 120. Each listing 125 generally represents an entity, e.g., a business, school, church, government agency, person, product, etc. Listings 125 may include data such as information from a directory, such as yellow pages or a white pages directory, a directory of content on a network, e.g., pages available on the world wide web, etc. Further, multiple listings 125 may represent a particular entity. Each listing 125 may contain a plurality of fields, representing various listing attributes, as illustrated in FIG. 2, discussed below.

A search result log 130 may also be stored in data store 120. The search result log 130 includes data about search results, such as which listings 125 were included in a search result, to what region the search results are associated, and which listings 125 may have been selected, i.e. clicked-through. Thus, search result log 130 may be used for the calculation of click-through rates.

Location data 135 may also be stored in data store 120. Additionally or alternatively, location data 135 may be stored in a separate location database, or on one or more servers separate from the search engine 115. In any event, the location data 135 typically contains information to enable a determination of the location of client 105. Location data 135 may take advantage of presently known and available databases that associate internet protocol (IP) addresses with physical locations. For example, as those skilled in the art will recognize, organizations such as the American Registry of Internet Numbers (ARIN) of Chantilly, Va. maintain registration information for IP addresses that includes a physical location. Location data 135 may include a compilation of data taken from one or more databases maintained by organizations such as ARIN, and include physical locations and their associated IP address or addresses. Other location information may also be stored in order to associate a search request with a location or region.

Location data 135 may be used to determine the location of the client 105, based on an IP address. For example, the location of the client 105 may be determined based on the IP address from which a query to the search engine 115 was sent. The location of the client 105 may be used for example, in determining the average click-through rates for listings 125 at or around the particular client's 105 location, discussed below.

Data sources 150 provide data for listings 125. Data store 120 may use a variety of known mechanisms for importing data from data sources 150, often via network 110. Data sources 150 may be made available by vendors, and/or listings 125 may be populated by data from computer readable media directly into data store 120, by data entry into data store 120, etc. Because data sources 150 are frequently provided by different parties, listings 125 populated from data sources 150 frequently include different listings 125 representing a single physical entity, e.g., a school, a church, a business, a government agency, a person, etc. Further, even when listings 125 are populated from a single data source 150, or from data sources 150 provided by a single vendor, data store 120 may include different listings 125 representing a single physical entity.

FIG. 2 illustrates an exemplary set of listings 125. As mentioned above, individual listings 125 may be represented by one or more database records included in data store 120. The listing 125 may include a plurality of fields, including for example a listing identifier 205. The listing identifier 205 may be a unique identifier, such as a Globally Unique Identifier (GUID), or an identity column or field in a database table that can be used to uniquely identity every listing 125 in the data store 120. Moreover, each listing 125 generally further includes various listing details 210, such as one or more of the identity of an advertiser who is associated with the listing 125, at least one geographic region with respect to which the listing 125 may be displayed, one or more categories, e.g., business categories, to which the listing 125 is relevant, a description of the listing 125, text to be included in the display of the listing 125, at least one keyword that may be used to search for the listing 125, a date/time the listing 125 was added to the data store 120, a hyperlink to direct the user to if the listing 125 is selected, etc. Other listing details 210 not illustrated in FIG. 2 are possible.

Figure 3:
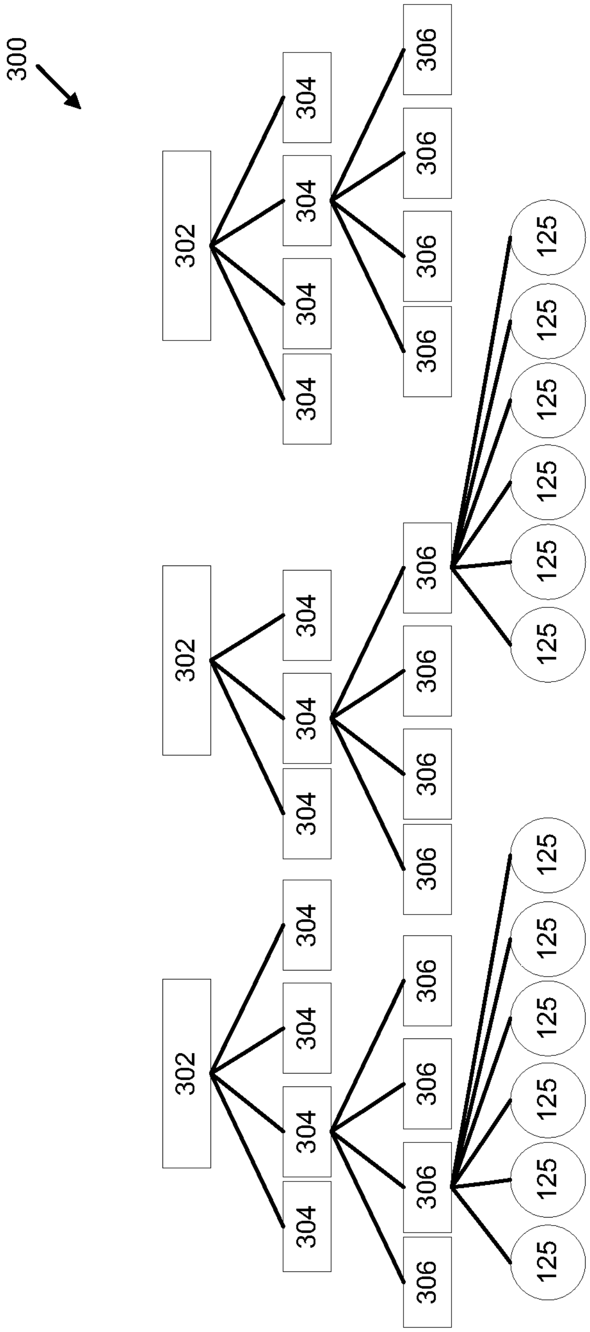
FIG. 3 illustrates an exemplary hierarchical index.

FIG. 3 illustrates an exemplary hierarchical index 300. Information may be organized into one or more hierarchical indices 300, wherein information may be arranged in a "tree" taxonomy. Hierarchical index 300 may generally be stored in data store 120. An index 300 generally includes one or more levels 302, 304, 306, 308, etc., the index thereby organizing elements that facilitate the retrieval of listings 125. For example, a top level of hierarchical index 300 may include one or more first-level items 302. Within each first-level item 302 may be one or more second-level items 304. Each second-level item 304 in turn may comprise one or more third-level items 306. Within data store 120, each third-level item 306 may be indexed to, i.e., associated with, one or more listings 125 that have been categorized. Thus, parameters to search queries may be associated with levels 302, 304, 306, 308, etc. to return listings 125 likely to be of interest to a user of client 105.

For example, listings 125 may include businesses that are listed in a "yellow pages" directory, and elements such as category families may comprise a first-level 302, sub-families may comprise a second-level 304, and a third-level 306 may represent different classifications of such businesses at a fourth-level 308. For example, a first-level 302 could include "Restaurants," a second-level 304 might include "Asian Restaurants," and a third-level 306 might include "Chinese Restaurants." Listings 125 may also include residences, other institutions and/or geographic features such as park trails, bikes trails, restrooms, bus stations, airports, automatic teller machines (ATMs), scenic views, statues, monuments, historical points, pay phones, train stations, subway stations, etc.

As another example, a geography hierarchy index 300 may include a particular geographic region (such as New York City, the state of Illinois, the nation of Ireland, etc.), as well as a geographical "level" within a geographic hierarchy (such as a city, state, country, etc.). For example, a first-level 302 could include "Countries," a second-level 304 might include "Regions," and a third-level 306 might include "Cities," e.g., "United States," "Illinois," and "Chicago," respectively. In the foregoing example, a geographic hierarchy index 300 is determined according to relative sizes of respective geographic areas. Alternately, levels of a geographic hierarchy index 300 could include regions grouped together by proximity of the geographical regions (e.g. to one another, distance from a common point, etc.), demography (e.g. population density, income level, school district achievement level, birth rate, age distributions, etc.), etc. Listings 125 may be associated with one or more geographic regions or geographic levels, or other geographically relevant information such as address, city, county, state, zip code, country, continent, longitude, latitude, elevation, telephone or fax number, or any other indicia of geographical location.

In other examples, listings 125 may be organized into multiple hierarchical indices 300, such as being organized according to a geographical hierarchy index 300 while at the same time also being organized into a category hierarchy index 300. For example, a listing 125 could be associated with the geographic location of the city of "Boston," and also with the category of "Italian Restaurants."

When a client 105 queries a search engine 115 for listings 125 that are of particular interest, the client 105 may focus the query by incorporating, for example, a geography and/or a category relating to the listings 125 being searched. Using the appropriate hierarchical index 300, the search engine 115 may return a set of listings 125 based on the parameters such as geography, category, etc., to enhance the ability of a client 105 to make targeted or focused search queries or requests. The focused nature of the search request allows the search engine 115 to provide the client 105 with a similarly focused response, often using the intersection of two or more indices 300, e.g., to find "Italian Restaurants" in "Boston."

FIG. 3 depicts a hierarchy index 300 having four levels. However, it is to be understood that the hierarchical index 300 may have fewer or greater than four levels. For example, a hierarchy could be created with ten or any other number of levels. Indeed, the particular number of levels or items is not critical.

FIG. 4 illustrates an exemplary search result log 130. Search result log 130 may be represented by one or more database records included in the data store 120. The search result log 130 includes information on the listings 125 returned from the search engine 115. For example, the search result log 130 may include the listing identifier 205 of each listing returned from the search engine 115. In addition, the search result log 130 may include search log details 405 including additional information. For example, the search log details 405 may include the rank of the listing 125 in the search results, what keywords were queried resulting in the listing 125 being included, whether or not the listing 125 was selected (e.g. clicked-through, highlighted, hovered over, expanded, etc.), from what geographic location or region a search request was initiated, and a time or date when a search was performed. From the search result log 130, data including how many times a listing 125 was displayed, and out of those times how many times a listing 125 was clicked on or otherwise selected may be determined. Additionally, the rank or position at which a listing 125 was situated when clicked on may also be retrieved from the search result log 130.

As used herein, the term "impression" refers to an appearance of a listing 125 within a set of search results. "Impression count" refers to the number of impressions for that particular listing 125. A "click count" refers to the number of times an impression of a listing 125 is selected, e.g., clicked on, highlighted, hovered over for a pre-determined amount of time, expanded, etc. Thus, a "click-through rate" (CTR), which refers to a click count divided by an impression count, may be used to measure the performance of pay-per-click (PPC) listings 125. However, PPC listings 125 may appear in different positions e.g., first as opposed to fourth in a set of five listings 125, and/or may be displayed in different sets of search results according to being searched using different category parameters and/or geography parameters. Thus, a CTR may not include all factors that are relevant to determining the performance of a listing 125, and thus may not be a useful way of measuring the relative performance of listings 125.

"CTR Normalization" refers to calculating performance metrics of PPC listings and determining a CTR that a listing would have achieved if it was displayed in a given position (generally but not necessarily the first position) every time it was included in a set of search results. The normalized click-through rate is typically based on an actual click-through rate that is adjusted based on which position a particular listing was provided in a set of search results or listings. Thus, CTR Normalization may provide a consistent, comparable metric of PPC performance of a listing, regardless of the position in which the listing was displayed in various sets of search results.

A normalized click-through rate, Norm_CTR, for a particular PPC listing may be defined as:

$$\text{Norm\_CTR} = \left(\sum_{i=0}^{n} \text{Avg\_CTR}_0 * CTR_i / \text{Avg\_CTR}_i\right) \Big/ n,$$

where:

$\text{Avg\_CTR}_0$ is the average click-through rate for a control set of PPC listings that have been provided in the first position in a set of search results. The size of this control set may be empirically determined, but the control set should be large enough to provide a meaningful sample of PPC listings;

$\text{Avg\_CTR}_i$ is the average click-through rate for a control set of PPC listings that have been provided in the ith position in a set of search results. The size of this control set may be empirically determined (i.e. based on an analysis of accumulated click-through-rate data), but it will be understood that the control set should be large enough to provide a meaningful sample of PPC listings;

$\text{CTR}_i$ is the click-through rate of the particular PPC listing of interest at the ith position; and n is an index of the possible positions for a listing 125, starting from position 0 as the first position for a listing 125. That is, the possible number of distinct positions in a set of search results that may be occupied by a listing 125 is n+1. For example, where a search result can respond with a maximum of five (5) listings 125, n is four (4).

It will be understood that the information needed to calculate Norm_CTR for a particular PPC listing will be generally obtainable by storing data relating to use of a search engine, directory server, or the like, e.g., as described above with respect to data that may be included in data store 120 and/or search result log 130.

If PPC listings are organized according to various hierarchical indices 300, e.g., a geography hierarchy, a category hierarchy, etc., then it is possible to normalize CTRs within such dimensions or hierarchies. For example, a click-through rate within a geography hierarchy could then be calculated as follows:

$$\text{Norm\_CTR}_{geography} = \left(\sum_{i=0}^{n} \text{Avg\_CTR}_0 * CTR_{i,geography} / \text{Avg\_CTR}_i\right) \Big/ n$$

Further for example, assuming a query requested a set of listings in the state of Massachusetts, the following could be calculated:

$$\text{Norm\_CTR}_{Massachusetts} = \left(\sum_{i=0}^{n} \text{Avg\_CTR}_0 * CTR_{i,Massachusetts} / \text{Avg\_CTR}_{Massachusetts}\right) \Big/ n$$

Moreover, a normalized click-through rate for a PPC listing according to more than one dimension or hierarchy may be calculated. The following example assumes that a search query has requested a PPC listings in the state of Massachusetts in the category of restaurants:

$$\text{Norm\_CTR}_{Massachusetts,restaurants} = \left(\sum_{i=0}^{n} \text{Avg\_CTR}_0 * CTR_{i,Massachusetts,restaurants} / \text{Avg\_CTR}_{Massachusetts,restaurants}\right) \Big/ n$$

Numerous variations of the above formulae are possible. For example, different statistical values than the ones described above, e.g., median rather than average CTRs, could be used. It is preferable to use values that in practice reflect the best correlation between a normalized click-through rate and a user's selection of a PPC listing. These values may be determined through experimentation, using site traffic and/or simulations, etc.

A campaign may be understood as an advertisement for a specific service or product that an advertiser may want to promote. Advertisers may bid for positioning a campaign in one or more category and geography combinations. Each such combination may constitute a different bid for the campaign.

A CTR is calculated for a campaign across different listings 125 for which it may have been displayed. The average CTRs may be the averages of all campaigns across all listings for a specific position with same category and geometry. Then, the average CTRs for a listing 125 appearing in association with different elements in one or more indices 300, and at different positions in search results, may be calculated.

For example, a normalized CTR for a specific geography, category, and campaign could be calculated as follows:

$$\text{Norm\_CTR} = \left(\sum_{i=0}^{n} \frac{\text{Avg\_CTR}(0, \text{geography, category}) * CTR(i, \text{geography, category, campaign})}{\text{Avg\_CTR}(i, \text{geography, category})}\right) \Big/ n,$$

where

CTR(i, geography, category, campaign) is the CTR of a campaign with certain category and geography at position i. The CTR function here determines the aggregate CTR for the given inputs. Position i is the position in a ranked list. In the example shown the CTR function determines the CTR at position i within a chosen geography, category, and campaign.

Avg_CTR(i, geography, category) is the average CTR of all campaigns at the position i with the same category and geography. A control set is a set of campaigns with the same geography and category. If there is insufficient data for any given geography, the geography may be expanded so that more campaigns are included, thus providing additional data.

n is the index of possible positions, starting from position 0 as the first position for a listing 125. That is, the possible number of distinct positions in a set of search results that may be occupied by a listing 125 is n+1. For example, where a search result can respond with a maximum of five (5) listings 125, n is four (4).

In this example, the denominator including the Avg_CTR function may be characterized as the expected CTR value for a given category and geography when a listing is placed in the ith position in a set of search results. In general, the Avg_CTR function may draw upon statistical analysis of accumulated data to determine the average CTR. Alternately, for campaigns that are newly introduced, average CTR may be calculated for that geography and category combination (or if there is not sufficient data, the average CTR of an expanded aggregate geography for the same geography or category).

Position 0 is the first position of a listing 125 in the sorted list presented to a user (e.g., the top position on a top page). Thus, continuing with the same example, Avg_CTR(0,geography,category) is the average CTR of all campaigns at the top position within a given category and a geography.

Figure 5:
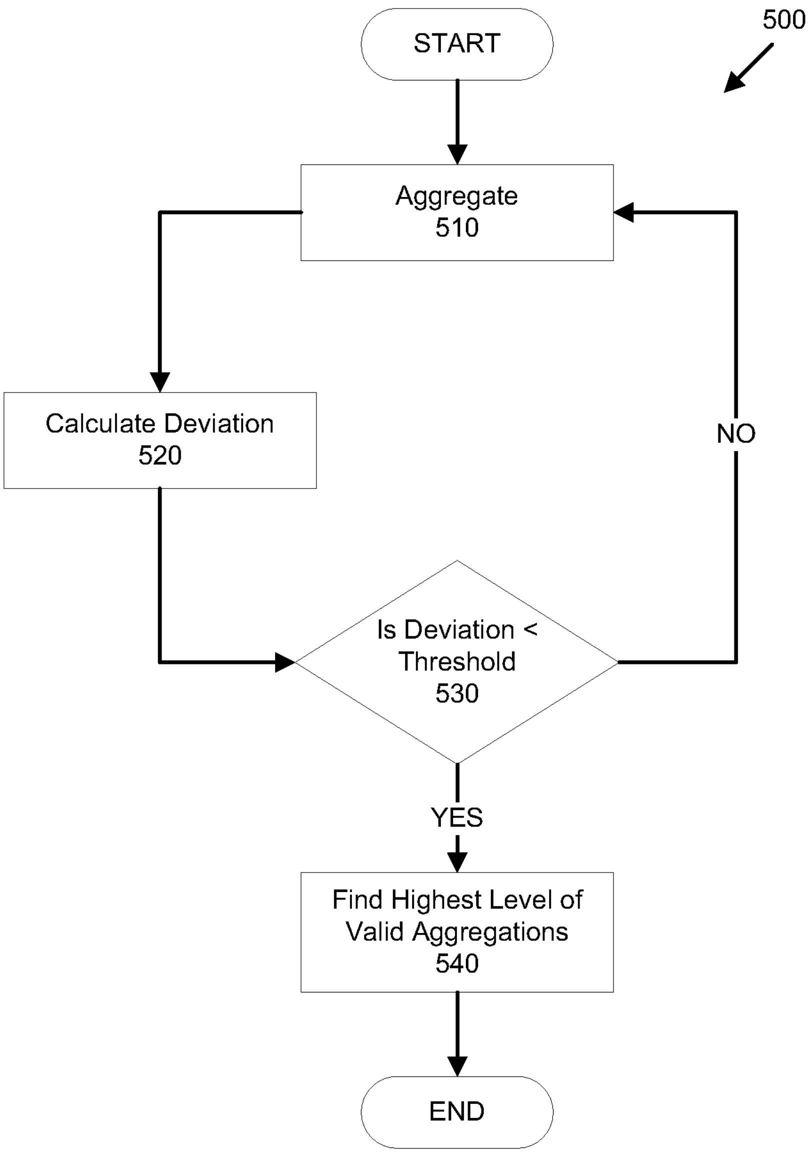
FIG. 5 illustrates an exemplary process flow for arriving at an acceptable level of aggregation within a hierarchical index.

FIG. 5 illustrates an exemplary process flow 500 for arriving at an acceptable level of aggregation within a hierarchical index 300. The process 500 may compare listing 125 performance with the advantage of organizing and collecting information related to each search. If CTRs are used without any aggregation, the number of CTRs may be large, for example if a hierarchical index 300 contains a large number of items 306. Furthermore, there may not be search result log 130 entries for many items 306 within a hierarchical index 300, resulting in insufficient data to calculate a CTR. The search queries submitted by clients 105 may invoke the system 100 to aggregate CTRs based on the other categories and levels within the hierarchical index 300. For example, the process 500 may starts from the most detailed level of granularity and progress to higher levels within the hierarchical index 300. Although process 500 is described with respect to a geographic index 300, it is to be understood that process 300 is also applicable with respect to other kinds of indices 300, e.g., category index 300.

In step 510, process 500 begins with an aggregation of click-through counts being performed. The process 500 starts from a lowest level of granularity and progresses to higher levels, where higher levels of granularity correspond to larger geographic areas (e.g. from small towns/cities, metro areas, counties, states, geographic areas and finally to country level aggregation). For example, cities or towns may represent the lowest level granularity for which data is available. Then, each aggregation higher than that may be computed by a "weighted addition" of all the CTRs of a geographic area at the level of granularity being computed. "Weighted Addition" may ensure sure that the geographic regions with more clicks and/or impressions will be given greater weight than regions with fewer clicks and/or impressions when aggregating data. Weights may be assigned to each geographic region in a set of geographic regions, where the assigned weights may be a function of the number of clicks and impressions received for that region. The actual weighting function may be determined periodically based on an analysis of historical data. Weighted addition ensures that each geographic region affects the CTR of an aggregate geography in a manner proportionate to the number of clicks and impressions that it receives. "Weighted addition" means that listings 125 associated with geographic regions generally having larger numbers of clicks and impressions than other regions are weighted accordingly. Weighted addition may thus be accomplished by adding all the click counts and all the impression counts of lower level combinations multiplied by the weight associated with the corresponding geographic region that fall within a higher level of granularity (for example all the cities/towns that fall under the definition of a greater metro) and arriving at an aggregated CTR for the aggregated geographic level.

Next, in step 520, a deviation between the CTR of the constituent geographies (e.g. for each third-level item 306 within a second-level item 304) and the CTR of the aggregated geographic levels (e.g. second-level item 304) is computed. For example, the standard deviation of the difference between the CTR of constituent geographies and the CTR of the aggregated geographic level may be computed.

Next, in step 530, the deviation between the CTR of the lower level geographies, (e.g. a third-level item 306 within a second-level item 304) and the CTR of the aggregated geographic levels (e.g. a second-level 304) are then compared, in order to determine whether that level of geographic aggregation (i.e. aggregating third-level items 306 within a second-level item 304) may be accepted as valid. A pre-defined reasonable threshold is a value or range such that if a deviation is within that range or deviates less than that value, then that level of aggregation may be accepted as valid. Continuing with the example mentioned above, if the standard deviation is within a pre-defined reasonable threshold, then that level of aggregation may be accepted as valid, and step 540 is executed next. Otherwise, step 510 is executed next.

Finally, in step 540, the process 500 chooses the highest level of geographic aggregation (i.e. the highest level within a hierarchical index 300, e.g. the greatest geographical area) that also comfortably falls within the pre-defined reasonable threshold. If the level of aggregation fails to fall within the pre-defined threshold, the next-highest level of aggregation may be chosen.

Following step 540, process 500 ends.

Figure 6:
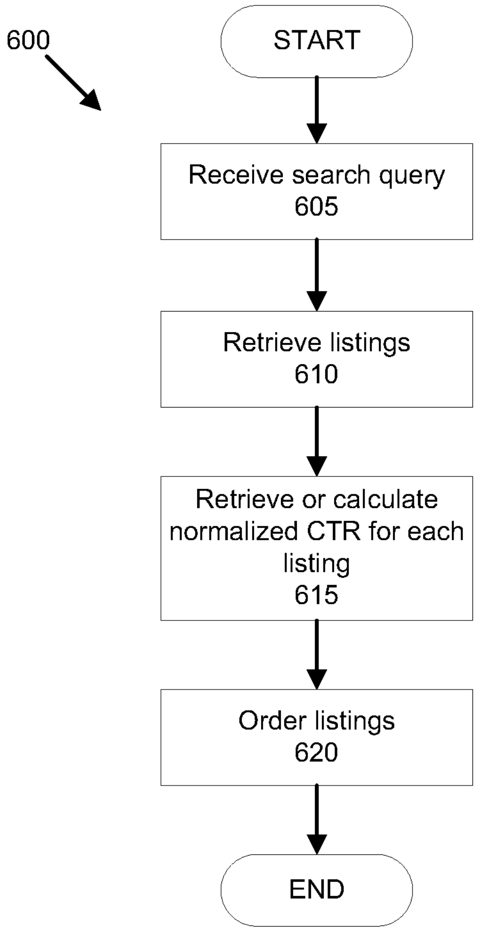
FIG. 6 illustrates an exemplary process for using normalized click-through rates to order listings provided in response to a search query.

FIG. 6 illustrates an exemplary process 600 for using normalized click-through rates to order listings provided in response to a search query.

In step 605, a search query is received, e.g., at a web server, search engine server, directory server, or the like. Such a search query may be a keyword search, or may be the result of a user selecting a hyperlink, or selecting various dimensional attributes, e.g., geographical attributes, business categories, etc. through a graphical user interface (GUI) or the like.

Next, in step 610, listings 125, including PPC listings 125, are retrieved in response to the search query received in step 605. Listings 125 may be retrieved, for example, from one or more databases such as data store 120 including listings 125.

Next, in step 615, a normalized click-through rate is identified for each of the PPC listings 125 retrieved in step 610. Such a normalized click-through rate may be calculated for a PPC listing 125 on a periodic basis and stored in data store 120 along with, or associated with, the PPC listing 125. However, a normalized click-through rate may be calculated for PPC listings 125 after they are retrieved as described above in step 610. For example, it may not be practical to pre-calculate and store normalized click-through rates for PPC listings 125 for all different possible combinations of dimensions that could include the PPC listing 125 in a response to a query. In any event, the normalized click-through rate identified in this step 615 may be calculated according to one of the formulae set forth above.

Next, in step 620, PPC listings 125 and other listings 125, if any, retrieved in step 610, are ordered, e.g., for display to a user. Generally PPC listings 125 are ordered according to their normalized click-through rates, where a higher normalized click-through rate merits a PPC listing 125 a higher position in the set of listings 125 retrieved in step 610. Further, any non-PPC listings 125 are generally displayed after all PPC listings 125. Moreover, it is to be understood that factors other than normalized click-through rates may be used to order PPC listings 125. For example, some combination of a bid amount for a PPC listing 125 along with a normalized click-through rate for the PPC listing 125 may be used to determine the position of the PPC listing 125 in a set of listings 125 returned from a search query.

Following step 620, process 600 ends.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention. Accordingly, it is to be understood that the above description is intended to be illustrative and not restrictive. Many embodiments and applications other than the examples provided would be apparent to those of skill in the art upon reading the above description.

We claim:

1. A Non-Transitory computer-readable medium tangibly storing instructions executable on one or more computers, the instructions including instructions for:

retrieving at least one listing based on a search query, the query including at least one parameter associated with an element of a hierarchical index;

determining a normalized click-through rate for each of the at least one listings, the normalized click-through rate for a listing being based on a click-through rate for the listing that is adjusted according to one or more positions in which the listing has been displayed in each of a plurality of sets of search results; and determining a position for the at least one listing in a set of search results based at least in part on an aggregation of the normalized click-through rates associated with at least one level of a hierarchical index;

aggregating normalized click-through rates associated with a first level of a hierarchical index into an aggregate normalized click-through rate for the first level;

aggregating normalized click-through rates associated with a second level of a hierarchical index into an aggregate normalized click-through rate for the second level;

determining a deviation of the difference between the second-level normalized click-through rates and the first-level normalized click-through rates;

comparing the deviation with a predetermined threshold; and accepting the first-level normalized click-through rate as a valid aggregation when the deviation is below the predetermined threshold.

2. The Non-Transitory computer-readable medium of claim 1, wherein the hierarchical index is a plurality of hierarchical indices.

3. A method, comprising:

identifying a listing; and determining, in a computer, a click-through rate for the listing based at least in part on:

at least one element within a first hierarchical index with which the listing is associated; and a count of the number of times the listing has been selected by a user when displayed at a particular position at which the listing was displayed in a set of search results.

4. The method of claim 3, further comprising adjusting the click-through rate for the listing based on positions in which the listing was displayed in sets of search results.

5. The method of claim 4, further comprising adjusting the click-through rate for the listing to indicate a click-through rate for a listing displayed at a given position.

6. The method of claim 5, wherein the given position is one of a first position, second position, third position, fourth position, or fifth position.

7. The method of claim 4, further comprising adjusting the click-through rate for the listing according to the formula:

$$\text{Norm\_CTR}_{hierarchy} = \left(\sum_{i=0}^{n} \text{Avg\_CTR}_0 * CTR_{i,hierarchy} / \text{Avg\_CTR}_i\right) \Big/ n,$$

where:

$\text{Avg\_CTR}_0$ is the average click-through rate for a control set of pay-per-click listings that have been provided in the first position in the sets of search results;

$\text{Avg\_CTR}_i$ is the average click-through rate for a control set of pay-per-click listings that have been provided in the ith position in the sets of search results;

$\text{CTR}_{i,hierarchy}$ is the click-through rate of the listing of interest associated with a given element within the first hierarchy and at the ith position; and n is the total number of possible positions considered.

8. The method of claim 3, further comprising determining the click-through rate based at least in part on at least one element within a second hierarchical index with which the listing is associated.

9. The method of claim 8, wherein the first hierarchical index is a hierarchical geography index, and the second hierarchical index is a hierarchical category index.

10. The method of claim 9, further comprising adjusting the click-through rate for the listing according to the formula:

$$\left(\sum_{i=0}^{n} \frac{\text{Avg\_CTR}(0, \text{geography}, \text{category}) * CTR(i, \text{geography}, \text{category}, \text{campaign})}{\text{Avg\_CTR}(i, \text{geography}, \text{category})}\right) \Big/ n,$$

where:

CTR(i, geography, category, campaign) is the click-through rate of a campaign associated with a given category within the hierarchical category index and associated with a given geography within the hierarchical geography index and at position i;

Avg_CTR(0, geography, category) is the average click-through rate of all campaigns at position 0 associated with the given category and the given geography; and Avg_CTR(i, geography, category) is the average click-through rate of all campaigns at the position i associated with the given category and the given geography, and n is the possible number of distinct positions occupied by the listing.

11. A method, comprising:

retrieving or calculating normalized click-through rates for a first level of a hierarchical index;

aggregating, in a computer, the normalized click-through rates that fall under a second level of the hierarchical index into an aggregate normalized click-through rate for the second level;

determining a statistical deviation of the difference between the second-level normalized click-through rates and the first-level normalized click-through rates;

comparing the deviation with a predetermined threshold; and accepting the first-level normalized click-through rate as a valid aggregation when the deviation is below the predetermined threshold.

12. The method of claim 11, further comprising sorting a plurality of valid aggregate click-through rates to determine the highest level of acceptable aggregation.

13. The method of claim 12, wherein the hierarchical index is a geographical hierarchy.

14. The method of claim 13, wherein the geographical levels of the geographical hierarchy are organized according to at least one of proximity, demography, and size.

15. The method of claim 12, further comprising ordering a set of listings based on the click-through rates at the highest level of acceptable aggregation.

16. The method of claim 15, wherein the set of listings includes at least one pay-per-click listing.

17. The method of claim 11, wherein the deviation is a standard deviation.

18. The method of claim 11, further comprising adjusting the click-through rates based on one or more positions in which listings have been displayed in each of a plurality of sets of search results.

19. The method of claim 18, further comprising basing the normalized click-through rates on actual click-through rates adjusted to indicate click-through rates for listings at a given position.

20. The method of claim 19, wherein normalizing the click-through rates further comprises using the formula:

$$\left(\sum_{i=0}^{n} \frac{\text{Avg\_CTR}(0, \text{geography}, \text{category}) * CTR(i, \text{geography}, \text{category}, \text{campaign})}{\text{Avg\_CTR}(i, \text{geography}, \text{category})}\right) \Big/ n,$$

where:

CTR(i, geography, category, campaign) is the click-through rate of a campaign with a given category within a hierarchical category index and a given geography within a hierarchical geography index and at position i;

Avg_CTR(0, geography, category) is the average click-through rate of all campaigns at position 0 with the given category and the given geography; and Avg_CTR(i, geography, category) is the average click-through rate of all campaigns at the position i with the given category and the given geography and n is the possible number of distinct positions occupied by the listing.

* * * * *